United States Patent
Kronestedt et al.

(10) Patent No.: US 9,226,303 B2
(45) Date of Patent: Dec. 29, 2015

(54) METHOD AND ARRANGEMENT FOR SUPPORTING RADIO RESOURCE MANAGEMENT

(75) Inventors: Fredric Kronestedt, Ekerö (SE); Konstantinos Dimou, Stockholm (SE); Jawad Manssour, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/115,672

(22) PCT Filed: May 10, 2011

(86) PCT No.: PCT/SE2011/050591
§ 371 (c)(1), (2), (4) Date: Nov. 5, 2013

(87) PCT Pub. No.: WO2012/154097
PCT Pub. Date: Nov. 15, 2012

(65) Prior Publication Data
US 2014/0087747 A1 Mar. 27, 2014

(51) Int. Cl.
H04W 4/00 (2009.01)
H04B 7/00 (2006.01)
H04B 1/00 (2006.01)
H04W 72/08 (2009.01)

(52) U.S. Cl.
CPC .......... H04W 72/082 (2013.01); H04W 72/085 (2013.01)

(58) Field of Classification Search
CPC .................................. H04B 15/00; H04Q 7/20
See application file for complete search history.

(56) References Cited

U.S. PATENT DOCUMENTS

| | | | |
|---|---|---|---|
| 6,430,414 B1 * | 8/2002 | Sorokine et al. | 455/442 |
| 2007/0173271 A1 * | 7/2007 | Hulkkonen et al. | 455/509 |
| 2009/0197588 A1 * | 8/2009 | Khandekar et al. | 455/422.1 |
| 2009/0201867 A1 * | 8/2009 | Teo et al. | 370/329 |
| 2010/0278063 A1 | 11/2010 | Kim et al. | |
| 2010/0311452 A1 * | 12/2010 | Li et al. | 455/509 |
| 2010/0317292 A1 * | 12/2010 | Takatani et al. | 455/63.1 |
| 2011/0003611 A1 | 1/2011 | Haas et al. | |

OTHER PUBLICATIONS

International Preliminary Report on Patentability for International Application No. PCT/SE2011/050591, mailed Nov. 12, 2013, 8 pages.

(Continued)

*Primary Examiner* — Chuong A Ngo
*Assistant Examiner* — Frantz Bataille
(74) *Attorney, Agent, or Firm* — Withrow & Terranova, PLLC

(57) ABSTRACT

A method and apparatus in a base station serving a first cell in a cellular network, for supporting radio resource management, RRM, in the cellular network. The base station obtains measurements (M) of signals transmitted in the first cell and of signals transmitted in at least one neighboring cell and determines a cell isolation factor of the first cell, based on the obtained measurements, the cell isolation factor indicating insusceptibility to interference from signals transmitted in the neighboring cell(s). The determined cell isolation factor is then used to support RRM for terminals in the network, e.g. as a basis for determining whether to employ an RRM scheme or not. Thereby, it is possible to decide to employ the RRM scheme for cells where it is effective and helpful and not in other cells.

22 Claims, 3 Drawing Sheets

(56) References Cited

OTHER PUBLICATIONS

Ericsson, "E-UTRA UE Radio Measurement Reporting for Uplink ICIC," Tdoc R2-082402, 3GPP TSG RAN WG2 #62, May 5-9, 2008, Kansas City, MO, 3 pages.
Extended European Search Report for Patent Application No. 11865093.6, mailed Sep. 15, 2014, 8 pages.
Author Unknown, "3GPP TS 36.214: Chapter 5: Measurement Capabilities for E-UTRA (Release 10)," 3rd Generation Partnership Project (3GPP), Mar. 2011, vol. 10.1.0, 2 pages.
Author Unknown, "C/I Ratio," Focal Dictionary of Telecommunications, Focal Press, Retrieved Jan. 27, 2012, 1 page, http://www.credoreference.com/entry/bhfidt/c_i_ratio.
International Search Report for PCT/SE2011/050591, mailed Feb. 2, 2012, 5 pages.

* cited by examiner

METHOD AND ARRANGEMENT FOR SUPPORTING RADIO RESOURCE MANAGEMENT

This application is a 35 U.S.C. §371 national phase filing of International Application No. PCT/SE2011/050591, filed May 10, 2011, the disclosure of which is incorporated herein by reference in its entirety.

TECHNICAL FIELD

The present disclosure relates generally to a method and an apparatus in a base station for supporting radio resource management for wireless terminals in a cellular network.

BACKGROUND

In cellular networks for wireless communication, interference may occur in a considered cell caused by signals transmitted in nearby located cells, which is a well-known problem. In such a network, the available radio bandwidth is limited and in order to provide capacity for communications in the network having multiple cells, resources pertaining to radio bandwidth must be reused in cells at a sufficient mutual distance so as to not disturb communication for one another. In this context, cells that are located near a serving cell are often referred to as "neighbouring cells" and this term will be used here in the sense that transmissions in neighbouring cells may potentially disturb transmissions in the serving cell, and vice versa, thus causing interference. It should be noted that a neighbouring cell is not necessarily located right next to the serving cell but may be located one or more cells away, still causing interference.

The following description is relevant for cellular networks using any of the following radio access technologies: Orthogonal Frequency Division Multiplexing (OFDM), Single Carrier—Frequency Division Multiple Access (SC-FDMA), Orthogonal Frequency Division Multiple Access (OFDMA), Time Division Multiplex (TDM), Frequency Division Multiplex (FDM) and Code Division Multiple Access (CDMA). A general problem in such cellular networks is that performance in communications will be degraded due to interference when the same radio resources are reused in multiple adjacent cells. This problem is typically more common for so-called cell edge terminals, i.e. terminals located close to the cell border and thus also close to neighbouring cells in the vicinity, as opposed to terminals located closer to the cell center and thus not as close to the neighbour cells.

In order to address these interference related problems, several Radio Resource Management (RRM) mechanisms can be employed and, among others, so-called Inter-Cell Interference Coordination (ICIC) mechanisms have been developed. Some examples of such RRM mechanisms are briefly outlined below.

A so-called High Interference Indicator (HII), referring to uplink resource allocations for cell edge terminals in a first cell, may be sent to the base stations of one or more neighbouring cells. The HII basically indicates that a certain set of uplink radio resources will be allocated to cell edge terminals in the first cell. As cell edge terminal are primarily affected by inter-cell interference, a neighbouring base station receiving the HII can thus avoid allocating radio resources from the same set to its own cell edge terminals, primarily.

A so-called Overload Indicator (OI), referring to uplink interference experienced in the first cell, may further be sent to the base stations of one or more neighbouring cells. The OI basically indicates that the current interference level on a certain set of radio resources exceeds a certain threshold in the first cell. In response thereto, a neighbouring base station can thus reduce the interference from the neighbouring cell in the first cell by allocating a different set of resources to its own terminals, or by allocating the interference generating set of resources only to terminals close to the cell center and not to cell edge terminals. The HII can be seen as a proactive RRM mechanism while the OI is a reactive one. Further, the HII and the OI can be exchanged between base stations on the well-known X2 interface, if used such as in Long Term Evolution (LTE) networks.

Further existing RRM mechanisms include exchanging a so-called Relatively Narrow band Transmission Power Indicator (RNTPI) referring to restrictions in downlink power, between neighbouring base stations. The RNTPI implies restrictions of transmission power in a certain part of the used radio bandwidth. A base station receiving this indicator may thus allocate radio resources for downlink transmissions within this band and restrict the transmit power accordingly.

The above RRM mechanisms rely on information exchanged between base stations, e.g. on the X2 interface. Other RRM mechanisms, or ICIC schemes, are autonomous in the sense that decisions regarding resource allocation and transmit power are taken internally within the base station without relying on information provided from base stations in neighbouring cells. For example, a scheme called Fractional Frequency Reuse (FFR) can be applied, at least for cell edge terminals, amongst a predetermined set of neighbouring cells such that a certain frequency band is used by the cells in turn, i.e. without overlapping with one another in time.

Other autonomous RRM mechanisms or schemes include Start Index and Random Start Index which a cell can apply in coordination with a predetermined set of neighbouring cells. In the Start Index scheme, resource allocations within a cell start from a given Physical Resource Block (PRB) index and follow a given direction of a predefined PRB sequence so as to avoid or at least reduce transmission overlaps between the cells. The resource allocations can also be done within opposite directions, referred to as bidirectional Start Index. The Random Start Index scheme is similar to the Start Index, apart from that resource allocations within a cell start from a random PRB index. Other available functions related to RRM include Interference Rejection Combining (IRC) in the base station's receiver for suppressing interference, and tilting the antenna at the base station to reduce uplink interference.

The above RRM mechanisms entail various restrictions in the usage of radio resources to limit the effects of interference between cells. However, these restrictions of radio resource usage also result in reduced capacity as compared to when all available radio resources can be used for communications in the cell. It is therefore a problem that the above RRM mechanisms and others are sometimes employed without much effect on the interference between cells, while still significantly reducing capacity in the cells. On the other hand, it could be quite helpful to use a suitable RRM mechanism when really needed to efficiently combat interference, e.g. depending on the propagation of signals between cells, such that the use of resources among neighbouring cells can be improved to achieve the greatest possible capacity in the network. A problem is therefore to know whether an RRM mechanism is potentially helpful or not for reducing inter-cell interference.

SUMMARY

It is an object of the invention to address at least some of the problems and issues outlined above. It is possible to achieve these objects and others by using a method and an arrangement as defined in the attached independent claims.

According to one aspect, a method is provided in a base station serving a first cell in a cellular network, for supporting radio resource management in the cellular network. In this method, the base station obtains measurements of signals transmitted in the first cell and of signals transmitted in at least one neighbouring cell. The base station then determines a cell isolation factor of the first cell based on the obtained measurements. The cell isolation factor indicates insusceptibility to interference from signals transmitted in the at least one neighbouring cell. The cell isolation factor is then used to support radio resource management for wireless terminals in the cellular network.

According to another aspect, a base station is provided that serves a first cell in a cellular network and the base station is configured to support radio resource management in the cellular network. The base station comprises an obtaining module adapted to obtain measurements of signals transmitted in the first cell and of signals transmitted in at least one neighbouring cell. The base station further comprises a logic module adapted to determine a cell isolation factor of the first cell based on the obtained measurements. The cell isolation factor indicates insusceptibility to interference from signals transmitted in the at least one neighbouring cell. The base station also comprises a control module adapted to use the cell isolation factor to support radio resource management for wireless terminals in the cellular network.

The above method and arrangement may be configured and implemented according to different optional embodiments. In one possible embodiment, the determined cell isolation factor is used as a basis for determining whether to employ a radio resource management scheme or not. For example, the radio resource management scheme may be employed if the determined cell isolation factor is below a predefined threshold. The base station may also receive another cell isolation factor of a neighbouring cell, which it can use as a basis for determining whether to employ the radio resource management scheme or not with respect to that particular neighbouring cell.

In other possible embodiments, using the cell isolation factor may include sending it to a base station in each considered neighbouring cell or to an Operations And Maintenance (OAM) node configured to distribute cell isolation factors to base stations in the cellular network. The cell isolation factor may be a statistical mean, median or minimum value determined from multiple measurements of signals transmitted in the first cell and of signals transmitted in the at least one neighbouring cell.

The cell isolation factor may pertain to downlink signals, and in that case the obtained measurements include measurements, made by terminals in the first cell, of downlink signals transmitted in the first cell and of downlink signals transmitted in the neighbouring cell(s).

The cell isolation factor may also pertain to uplink signals, and in that case the obtained measurements include measurements, made by terminals in the neighbouring cell(s), of downlink signals transmitted in the first cell, and these measurements are obtained from a base station in each neighbouring cell. In either case above, the downlink signals may include reference symbols, and a Reference Symbol Received Power (RSRP) or a Reference Symbol Received Power (RSRQ) of the reference symbols may have been measured by the terminals in the first cell and/or in the neighbouring cell(s).

In the case when the cell isolation factor pertains to uplink signals, the signals transmitted in the first cell and in the at least one neighbouring cell may also include uplink signals, while the measurements have been made by the base station of the first cell. These uplink signals may further include Sounding Reference Signals (SRS) while the measurements comprise received signal strength of the SRSs.

Further possible features and benefits of this solution will become apparent from the detailed description below.

BRIEF DESCRIPTION OF DRAWINGS

The invention will now be described in more detail by means of exemplary embodiments and with reference to the accompanying drawings, in which.

DETAILED DESCRIPTION

Figure 1:
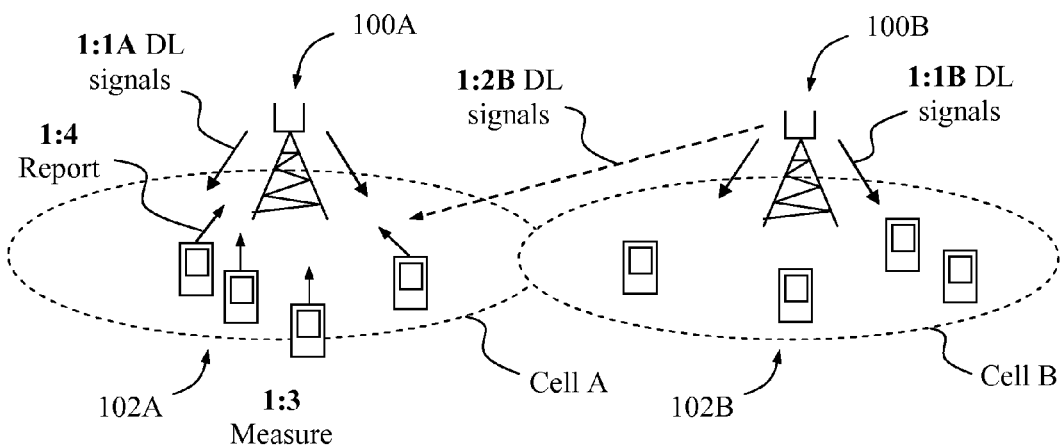
FIGS. 1-3 are different communication scenarios illustrating how a cell isolation factor can be determined, according to some possible embodiments.

Briefly described, a solution is provided to generally support Radio Resource Management, RRM, for wireless terminals in a cellular network, in particular for deciding whether it is helpful and efficient to employ any of the available RRM mechanisms, e.g. the ones exemplified above. It has been recognized in this solution that different cells can be more or less inclined to experience interference from transmissions in neighbouring cells, e.g. due to topographic characteristics of the cells which determines how well radio signals can propagate over a cell area.

This cell-specific attribute related to sensitivity to inter-cell interference can be quantified for a cell as a "cell isolation factor", according to features in this solution, which cell isolation factor indicates the cell's insusceptibility to interference from signals transmitted in at least one neighbouring cell. In this solution, a quantitative value of the cell isolation factor can be determined mathematically for a certain considered cell, which will be referred to as a "first cell" in the following description, from multiple measurements of signals transmitted in the first cell and of signals transmitted in at least one neighbouring cell. A high cell isolation factor thus indicates that the cell has low sensitivity to inter-cell interference, and vice versa.

For example, the cell isolation factor may be determined as the ratio between values of signals transmitted in the first cell and values of signals transmitted in one or more neighbouring cells and potentially causing interference, which will be described in more detail later below. Further, the cell isolation factor may be a statistical mean, median or minimum value determined from multiple measurements of signals in or from the first cell and the neighbouring cells, respectively. It is also possible to calculate a so-called probability density function (PDF) from the multiple measurements. From this function, the cell isolation factor can be determined at a desired probability level of the PDF. For example, a value defined by the "10% worst values" implies that in 90% of the cases the cell isolation factor is "better" than this value. If the PDF is used in this way, the "50% worst values" of the PDF actually correspond to the median value and the "100% worst values" correspond to the maximum value, and so forth.

By determining the cell isolation factor based on such measurements made over a period of time of signals communicated to and/or from multiple terminals in various communication sessions, the obtained cell isolation factor will provide a statistically truthful and reliable value that characterises the cell with respect to interference insusceptibility. The cell isolation factor is then used to support radio resource management for wireless terminals in the cellular network. In particular, the determined cell isolation factor can be used as a basis for determining whether to employ an RRM scheme or not, such as any of the RRM mechanisms described above. In this description, the term "RRM scheme" should be understood broadly as representing any operations and functions in the base station for reducing/suppressing inter-cell interference. The cell isolation factor may also be provided to one or more neighbouring base stations as a basis for a similar determination therein, e.g. as several RRM mechanisms are employed in coordination with a neighbouring cell.

The cell isolation factor of a cell thus characterises the cell in a current network configuration and is more or less static in the sense that it changes only when configuration of the first cell and/or its neighbouring cells is changed in a way that can affect the inter-cell interference. If the network is reconfigured at some point, e.g. when adding/removing cells or changing their coverage areas and/or bandwidth usage, the cell isolation factor can be determined once more, i.e. updated, from further signal measurements in the new configuration, at least for those cells affected by the reconfiguration. An update of the cell isolation factor may also be motivated if new buildings are added or old ones are removed in the cell area, affecting the signal propagation.

In more detail, the cell isolation factor may be determined mathematically for a first cell as follows. For example, if the first cell has N neighbouring cells where interfering signals can potentially be transmitted, the cell isolation factor can be determined as the ratio of the received signal strength of signals transmitted in the first cell, to the received signal strength of signals transmitted in the N neighbouring cells, where N can be anything from one and upwards. In the case of N>1, a sum of signal strength measurements of the N neighbouring cells will be considered in this determination.

Mathematically, the cell isolation factor denoted CIF can thus be determined as:

$$CIF = \frac{C(1)}{\sum_N C(n)} \quad (1)$$

where C(1) is a statistic representation of measured values of signals transmitted in the first cell, C(n) is a statistic representation of measured values on signals transmitted in each of the at least one neighbouring cell n, and N is thus the total number of neighbouring cells considered. In this context, the term "statistic representation" is used to indicate that multiple values of signals are measured as a basis for a common representative value. The number of measurements should be large enough to provide a statistically reliable result.

The cell isolation factor may also be determined in relation to one specific neighbouring cell j as:

$$CIF(j) = \frac{C(1)}{C(j)} \quad (2)$$

where C(1) is a statistic representation of measured values of signals transmitted in the first cell, and C(j) is a statistic representation of measured values of signals transmitted in the specific neighbouring cell j. Also in this case, the number of measurements used as a basis for calculating (2) should be large enough to provide a statistically reliable result.

Some optional examples of how the cell isolation factor of a first cell can be determined from various signal measurements in practice, will now be described with reference to FIGS. 1-3, respectively. In these figures, the first cell is denoted "cell A" and an exemplary neighbouring cell is denoted "cell B". While there may be any number of such neighbouring cells involved in this process, depending on the implementation, only one neighbouring cell, B, is shown for simplicity. The skilled person will understand that any number of neighbouring cells can be involved in a corresponding manner as described in any of the examples shown in FIGS. 1-3.

In FIG. 1, a base station 100A serving cell A transmits downlink signals, illustrated by an action 1:1A, which may include broadcast signals and dedicated signals directed to specific wireless terminals 102A present in cell A. Likewise, a base station 100B serving cell B transmits downlink signals, illustrated by an action 1:1 B, such as broadcast signals and dedicated signals directed to specific wireless terminals 102B in cell B. Another action 1:2B illustrates that the downlink signals transmitted from base station 100B are also received by the terminals 102A in cell A, and these signals may be experienced as interfering with the signals from base station 100A, as illustrated by the dashed arrow. It should be noted that the shown actions 1:1B and 1:2B are actually caused by the same downlink transmission from the base station 100B.

In this example, the terminals 102A in cell A measure, in an action 1:3, both the received signal strength of their "own" signals coming from base station 100A as of action 1:1A, and the received signal strength of the potentially interfering signals from base station 100B as of action 1:2B. A common practice is that base stations transmit reference symbols for enabling measurements by terminals in the own cell and in neighbouring cells, e.g. as a basis for evaluating reception quality. In this example, a received signal strength of such reference symbols, referred to as Reference Symbol Received Power (RSRP), or alternatively a received signal quality of the reference symbols, Reference Symbol Received Quality (RSRQ), can be measured by the terminals 102A in action 1:3.

Terminals 102A then report these signal strength measurements to their serving base station 100A, as indicated in action 1:4. Such measurement reports may be sent frequently to base station 100A according to regular procedures, e.g. to provide a basis for handover decisions and other actions. Thereby, the base station 100a of the first cell is able to obtain the measurements of downlink signals transmitted both in the first cell A and in the neighbouring cell B, and determine the cell isolation factor of the first cell based on the obtained measurements, e.g. using (1) or (2) above.

Hence, the cell isolation factor in this example pertains to downlink signals, and the measurements include measurements made by the terminals 102A in the first cell of downlink signals transmitted in the first cell, as of action 1:1A, and of downlink signals transmitted in the neighbouring cell B, as of action 1:2B. For example, base station 100A is able to determine the parameters C(1) and C(n) or C(j) in equation (1) or (2), if used, from the measurements obtained in action 1:4.

Figure 2:
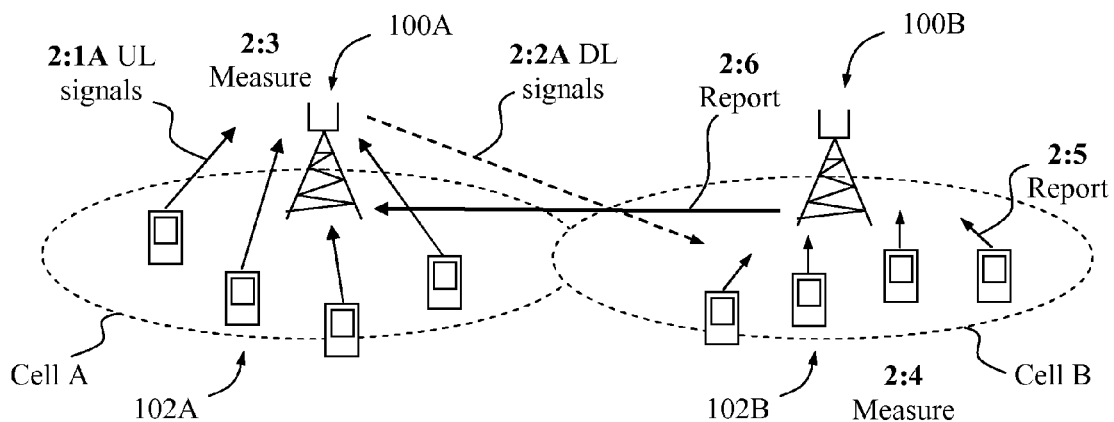

In FIG. 2, another example of obtaining signal measurements in the first cell A for determining the cell isolation factor of the first cell, is shown. An action 2:1A illustrates that the terminals 102A in cell A transmit uplink signals towards the base station 100A. An action 2:2A further illustrates that base station 100A transmits downlink signals, which are directed to the terminals 102A in its own cell A but are also received by the terminals 102B in cell B as interfering signals, as illustrated by the dashed arrow.

In another action 2:3, the base station 100A measures the uplink signals transmitted from terminals 102A in action 2:1A. Further, an action 2:4 illustrates that the terminals 102B also measure the downlink signals coming from base station 100A in action 2:2A, which can be used as a measure of how uplink signals if transmitted from the same terminals 102B would generate interference if received by base station 100A. These interfering uplink signals can thus be estimated by calculating a path loss of the signals downlink signals of action 2:2A, assuming that the pathloss is equal in both directions, i.e. uplink and downlink. The path loss can basically be determined as a deviation or difference between received signal strength and transmit power, assuming that the transmit power is known. A possible procedure for determining the path loss between a wireless terminal and a base station is described in more detail in WO 2010/085185 A1 (Ericsson).

These measurements in action 2:4 can be made because the terminals 102B are able to identify that the downlink signals come from base station 100A, e.g. based on a parameter called "Physical Cell Identifier" (PCI) typically included in downlink signals, while it may be more difficult for the base station 100A to identify that uplink signals sent by terminals 102B come from that particular neighbouring cell B in distinction from uplink transmissions in other cells. The terminals 102B further report their measurements to the base station 100B in an action 2:5, and base station 100B in turn report the measurements to the base station 100A in an action 2:6.

In this case, the cell isolation factor thus pertains to uplink signals, even though the measurements include measurements made by the terminals 102B in the neighbouring cell B of downlink signals transmitted in the first cell, as of actions 2:2A and 2:4. The base station 100A obtains these measurements from the base station 100B in the neighbouring cell, as of action 2:6. For example, base station 100A is able to determine the parameters C(1) and C(n) or C(j) in equation (1) or (2), if used, from the measurements obtained in actions 2:3 and 2:6, respectively.

Figure 3:
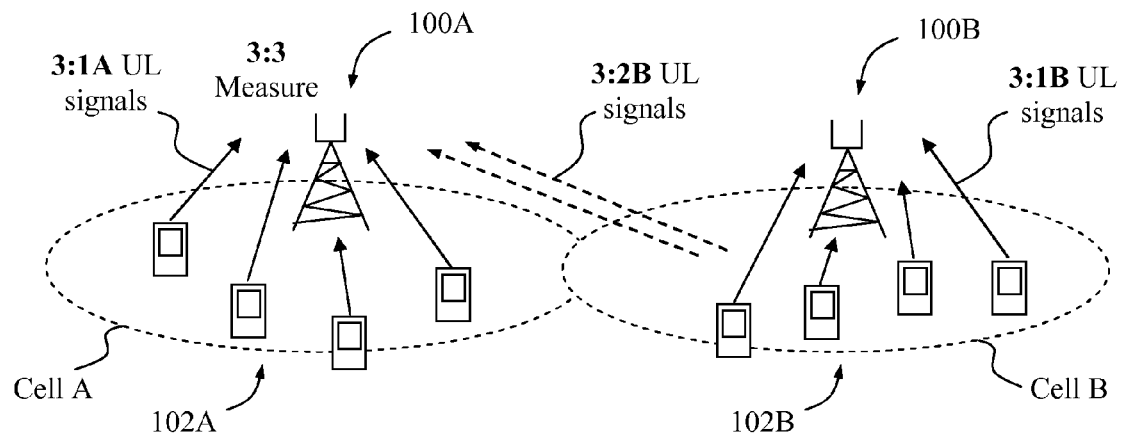

A third example of obtaining signal measurements in the first cell A for determining the cell isolation factor of the first cell, is illustrated in FIG. 3. Terminals 102A in cell A transmit uplink signals towards their serving base station 100A, shown in an action 3:1A, and terminals 102B in cell B likewise transmit uplink signals towards their serving base station 100B, shown in an action 3:1B. Another action 3:2B illustrates that the uplink signals transmitted from terminals 102B in cell B are also received by the base station 100A, and these signals may be experienced as interfering with the signals from terminals 102A, as illustrated by the dashed arrows. It should be noted that the shown actions 3:1B and 3:2B are actually caused by the same uplink transmissions from the terminals 102B.

In this case, the cell isolation factor pertains to uplink signals, as the signals transmitted in the first cell and in the at least one neighbouring cell include uplink signals, as of actions 3:1A and 3:2B. These measurements are made by the base station 100A, in an action 3:3, being possible if the base station 100A is able to distinguish which cell they come from, i.e. cell A and cell B, respectively. For example, the uplink signals may include so-called Sounding Reference Signals, SRSs, identifying the cell in which the signals are transmitted, and in that case the measurements may comprise received signal strength of the SRSs. Base station 100A is now able to determine the parameters C(1) and C(n) or C(j) in equation (1) or (2), if used, from the measurements obtained in action 3:3.

As mentioned above, the determined cell isolation factor may be used as a basis for determining whether to employ an RRM scheme or not. By way of a few non-limiting examples, the RRM scheme may including one or more of:

A) Exchanging with one or more base stations serving the at least one neighbouring cell, a High Interference Indicator, HII, referring to uplink resource allocations for cell edge terminals in the first cell.
B) Exchanging with one or more base stations serving the at least one neighbouring cell, an Overload Indicator, OI, referring to uplink interference experienced in the first cell.
C) Exchanging with one or more base stations serving the at least one neighbouring cell, a Relatively Narrow band Transmission Power Indicator, RNTPI, referring to restrictions in downlink power.
D) Applying Fractional Frequency Reuse, FFR, for cell edge terminals in the first cell in coordination with a predetermined set of neighbouring cells.
E) Applying Start Index or Random Start Index in coordination with a predetermined set of neighbouring cells.
F) Applying Interference Rejection combining, IRC, in the base station's receiver for suppressing interference.
G) Applying antenna tilt at the base station to reduce uplink interference.

Other operations and functions related to RRM may also be used, such as Fractional Power Control (FPC) etc., and the invention is not limited to the above-described examples. Further, the RRM scheme may be employed if the determined cell isolation factor is below a predefined threshold. If not, it may be deduced that the RRM scheme would not be effective enough to motivate employment thereof. Further, different cell isolation factor thresholds may be used for deciding on different RRM operations. The base station of the first cell may also receive another cell isolation factor of a neighbouring cell, which has been determined according to any of the examples described above. The received cell isolation factor may then be used as a further basis for determining whether to employ the radio resource management scheme or not with respect to that neighbouring cell.

Figure 4:
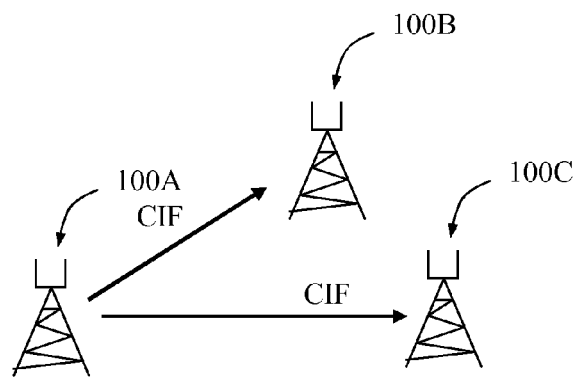
FIGS. 4 and 5 illustrate examples of how a cell isolation factor can be used, according to further possible embodiments.
Figure 5:
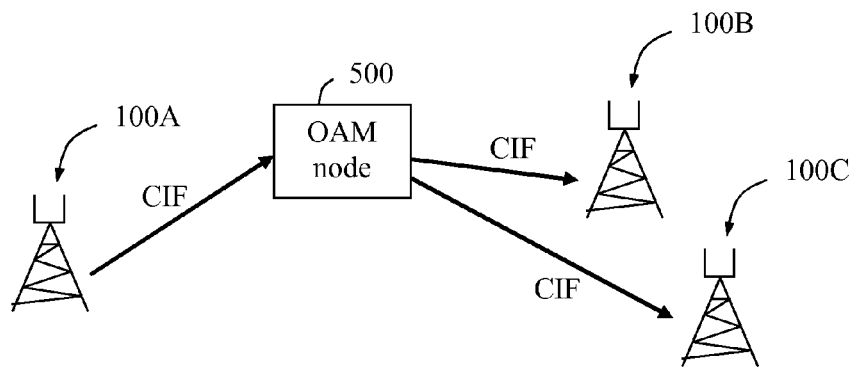

Using the determined cell isolation factor may further include sending it to one or more base stations in the neighbouring cells, e.g. using the X2 interface, or to an Operations And Maintenance (OAM) node configured to distribute cell isolation factors to base stations in the cellular network. These options are schematically illustrated in FIGS. 4 and 5. In FIG. 4, the base station 100A in the first cell has determined its cell isolation factor CIF in the manner described above and sends it to base stations 100B and 100C in respective neighbouring cells. In FIG. 5, the base station 100A in the first cell alternatively sends its CIF to and OAM node 500 which in turn distributes the CIF to the base stations 100B and 100C according to a suitable distribution procedure. Although two neighbouring cells and base stations are shown in FIGS. 4 and 5, it should be noted that any number of neighbouring cells and base stations may be involved as described in the above examples.

Figure 6:
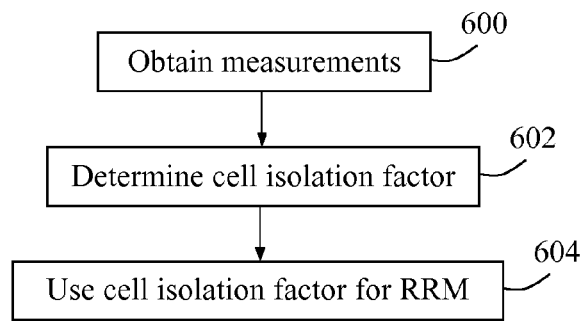
FIG. 6 is a flow chart illustrating a procedure in a base station for supporting radio resource management, according to further possible embodiments.

A procedure with actions executed in a base station serving a first cell in a cellular network, for supporting radio resource management in the cellular network, will now be described with reference to the flow chart in FIG. 6. A first action 600 illustrates that the base station obtains measurements of signals transmitted in the first cell and of signals transmitted in at least one neighbouring cell, e.g. in the manner described for the examples of FIGS. 1-3 above. In a next action 602, the base station determines a cell isolation factor of the first cell based on the obtained measurements. The cell isolation factor indicates insusceptibility to interference from signals transmitted in the at least one neighbouring cell. Actions 600 and 602 may be executed in the manner described for any of the examples in FIGS. 1-3 above, although the invention is not limited to these examples.

A final action 604 illustrates that the base station uses the determined cell isolation factor to support radio resource management for wireless terminals in the cellular network. As described above, using the determined cell isolation factor may include determining whether to employ an RRM scheme or not, based on the cell isolation factor, and/or sending it to one or more base stations in neighbouring cells or to an OAM node configured to distribute cell isolation factors to base stations in the cellular network.

Figure 7:
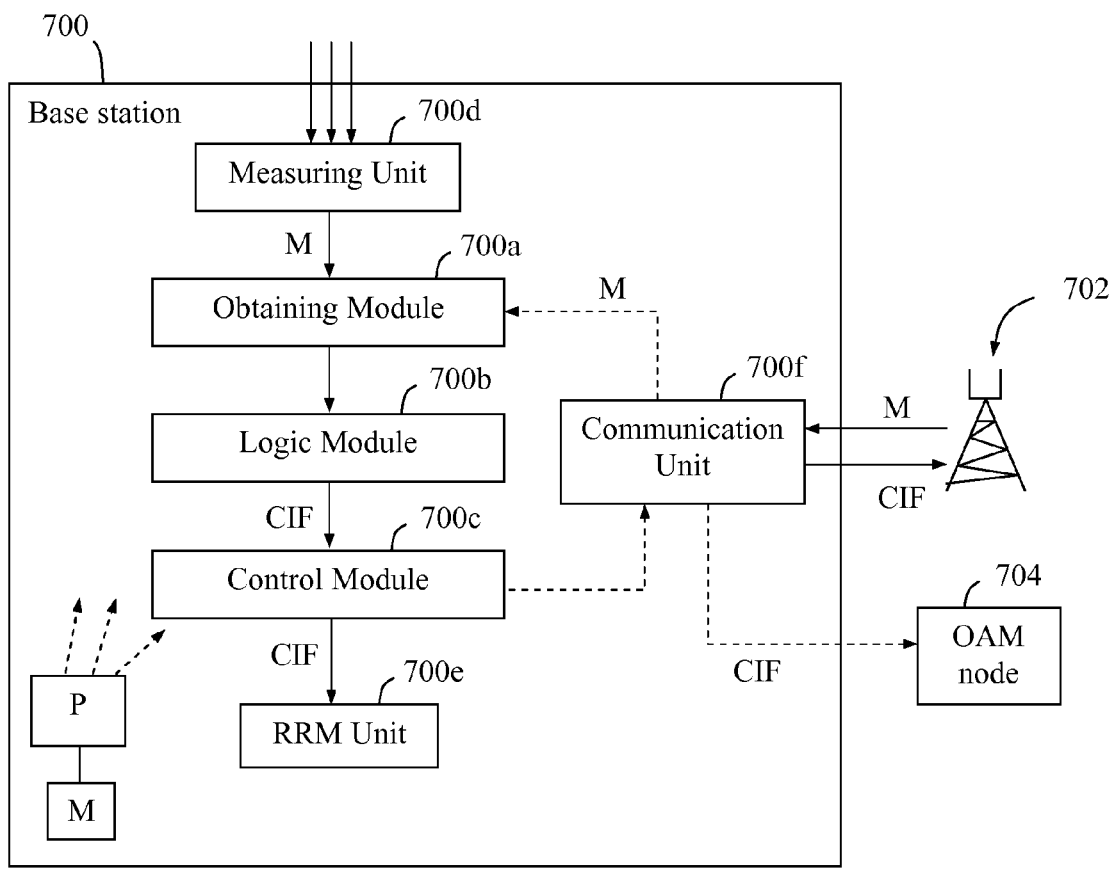
FIG. 7 is a schematic block diagram illustrating a base station in more detail, according to further possible embodiments.

A detailed but non-limiting example of how a base station can be configured to accomplish the above-described solution, is illustrated by the block diagram in FIG. 7. The base station 700 serves a first cell in a cellular network and is configured to support radio resource management, or RRM, in the cellular network, e.g. in the manner described above for any of FIGS. 1-6.

The base station 700 comprises an obtaining module 700a adapted to obtain measurements M of signals transmitted in the first cell and of signals transmitted in at least one neighbouring cell. For example, the obtaining module 700a may obtain signal measurements M from a measuring unit 700d that measures uplink signals transmitted from terminals in the first cell and/or in the at least one neighbouring cell. The obtaining module 700a may further obtain signal measurements M, via a communication unit 700f in the base station 700, when reported from terminals in the first cell and/or when reported from one or more neighbouring base stations, such as base station 702. The base station 700 also comprises a logic module 700b adapted to determine a cell isolation factor CIF of the first cell based on the obtained measurements M, the CIF indicating insusceptibility to interference from signals transmitted in the at least one neighbouring cell.

The base station also comprises a control module 700c adapted to use the determined cell isolation factor CIF to support RRM for wireless terminals in the cellular network. For example, the control module 700c may provide the CIF to an RRM unit 700e that decides whether to employ an RRM scheme or not in the base station 700, or to the communication unit 700f which then sends the CIF to one or more neighbouring base stations 702 or to an OAM node 704, as described above for FIGS. 4 and 5.

The above base station 700 and its functional modules 700a-700c may be configured or adapted to operate according to various optional embodiments. As mentioned above, the control module 700c may be further adapted to use the cell isolation factor by providing it to the RRM unit 700e as a basis for determining whether to employ an RRM scheme or not. The RRM scheme may, without limitation, include one or more of the above-described operations and functions.

In another embodiment, the RRM unit 700e is adapted to employ the RRM scheme if the determined cell isolation factor is below a predefined threshold, e.g. as described above. the control module 700c may also be further adapted to use the cell isolation factor by providing it to a base station in each of the at least one neighbouring cell, e.g. to the base station 702, or to the OAM node 704.

In other possible embodiments, if N is the number of neighbouring cells considered, the logic module 700b may be adapted to determine the cell isolation factor, CIF, as:

$$CIF = \frac{C(1)}{\sum_N C(n)} \quad (1)$$

where C(1) is a representation of measured values of signals transmitted in the first cell, C(n) is a representation of measured values on signals transmitted in each of the at least one neighbouring cell. The logic module 700b may also be adapted to determine the cell isolation factor CIF(j) of the first cell in relation to a specific neighbouring cell j, i.e. when N above is 1, as:

$$CIF(j) = \frac{C(1)}{C(j)} \quad (2)$$

where C(j) is a representation of measured values of signals transmitted in the specific neighbouring cell j.

It should be noted that FIG. 7 merely illustrates various functional modules or units in the base station 700 in a logical sense, although the skilled person is free to implement these functions in practice using suitable software and hardware means. Thus, this aspect of the solution is generally not limited to the shown structures of the base station 700, while the functional modules 700a-700c may be configured to operate according to the features described for any of FIGS. 1-6 above, where appropriate.

The functional modules 700a-c described above can be implemented in the base station 700 as program modules of a respective computer program comprising code means which, when run by a processor "P" causes the base station to perform the above-described actions. The processor P may be a single Central Processing Unit (CPU), or could comprise two or more processing units. For example, the processor P may include general purpose microprocessors, instruction set processors and/or related chips sets and/or special purpose microprocessors such as Application Specific Integrated Circuits (ASICs). The processor P may also comprise a storage for caching purposes.

Each computer program may be carried by a computer program product in the base station 700 in the form of a memory "M" connected to the processor P. The computer program product or memory M comprises a computer readable medium on which the computer program is stored. For example, the memory M may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the base station 700.

When using the solution according to any of the above-described embodiments, it is an advantage that one or more RRM schemes can be employed for cells where it is really effective and helpful and not in other cells, depending on the value of their individual cell isolation factors. As indicated above, a threshold value of the cell isolation factor can be predefined in a manner that will distinguish cells in terms of their insusceptibility to inter-cell interference and effectiveness of RRM schemes. It is further possible to use more than one threshold of the cell isolation factor in a cell, e.g. for activation/deactivation of different RRM schemes.

While the solution has been described with reference to specific exemplary embodiments, the description is generally only intended to illustrate the inventive concept and should not be taken as limiting the scope of the solution. For example, the terms "base station", "cellular network", "wireless terminal", "cell isolation factor", "radio resource management", "signals" and "measurements" have been used throughout this description, although any other corresponding nodes, functions, and/or parameters could also be used having the features and characteristics described here. The solution is defined by the appended claims.

The invention claimed is:

1. The method of determining a cell isolation factor is used as a basis for determining whether to employ a radio resource management scheme or not, said radio resource management scheme including one or more of:
   exchanging with one or more base stations serving the at least one neighbouring cell, a High Interference Indicator, HII, referring to uplink resource allocations for cell edge terminals in the first cell,
   exchanging with one or more base stations serving the at least one neighbouring cell, an Overload Indicator, OI, referring to uplink interference experienced in the first cell,
   exchanging with one or more base stations serving the at least one neighbouring cell, a Relatively Narrow band Transmission Power Indicator, RNTPI, referring to restrictions in downlink power,
   applying Fractional Frequency Reuse, FFR, for cell edge terminals in the first cell in coordination with a predetermined set of neighbouring cells,
   applying Start Index or Random Start Index in coordination with a predetermined set of neighbouring cells,
   applying Interference Rejection Combining, IRC, in the base station's receiver for suppressing interference, and
   applying antenna tilt at the base station to reduce uplink interference.

2. The method according to claim 1, wherein said radio resource management scheme is employed if the determined cell isolation factor is below a predefined threshold.

3. The method according to claim 1, further comprising receiving another cell isolation factor of a neighbouring cell, wherein said another cell isolation factor is used as a basis for determining whether to employ said radio resource management scheme or not with respect to said neighbouring cell.

4. The method according to claim 1, wherein using said cell isolation factor includes sending it to a base station in each of the at least one neighbouring cell or to an Operations And Maintenance node configured to distribute cell isolation factors to base stations in the cellular network.

5. The method of determining a base station serving a first cell in a cellular network, for supporting radio resource management in the cellular network, the method comprising:
   obtaining measured values of signals transmitted in the first cell and measured values of signals transmitted in at least one neighbouring cell;
   determining a cell isolation factor, CIF, of the first cell based on the obtained measured values, the cell isolation factor indicating insusceptibility to interference from signals transmitted in said at least one neighbouring cell and wherein said cell isolation factor, CIF, is determined as:

$CIF = C(1)/\Sigma C(n)$ where $C(1)$ is a representation of the obtained measured values of signals transmitted in the first cell, $C(n)$ is a representation of the obtained measured values of signals transmitted in each of the at least one neighbouring cell, and N is the number of neighbouring cells considered; and
   using said cell isolation factor to support radio resource management for wireless terminals in the cellular network.

6. The method according to claim 5, wherein the cell isolation factor is a statistical mean, median or minimum value determined from multiple measured values of signals transmitted in the first cell and of signals transmitted in the at least one neighbouring cell.

7. The method according to claim 5, wherein the cell isolation factor pertains to downlink signals, and said the obtained measured values include values of measurements made by terminals in the first cell of downlink signals transmitted in the first cell and of downlink signals transmitted in the at least one neighbouring cell.

8. The method according to claim 5, wherein the cell isolation factor pertains to uplink signals, said the obtained measured values include values of measurements made by terminals in the at least one neighbouring cell of downlink signals transmitted in the first cell, and said the obtained measured values are obtained from a base station in each of the at least one neighbouring cell.

9. The method according to claim 7, wherein the downlink signals include reference symbols, and wherein a received signal strength of said reference symbols, Reference Symbol Received Power, RSRP, or a received signal quality of said reference symbols, Reference Symbol Received Quality, RSRQ, have been measured by the terminals in the first cell and/or in the at least one neighbouring cell.

10. The method according to claim 5, wherein the cell isolation factor pertains to uplink signals, the signals transmitted in the first cell and in the at least one neighbouring cell include said uplink signals, and said the obtained measured values have been measured by the base station of the first cell.

11. The method according to claim 10, wherein said uplink signals include Sounding Reference Signals, SRSs, and the obtained measured values comprise received signal strength of said SRSs.

12. A method of determining a base station serving a first cell in a cellular network, for supporting radio resource management in the cellular network, the method comprising:
   obtaining measured values of signals transmitted in the first cell and measured values of signals transmitted in at least one neighbouring cell,
   determining a cell isolation factor, CIF(i), of the first cell based on the obtained measured values, the cell isolation factor indicating insusceptibility to interference from signals transmitted in said at least one neighbouring cell and the cell isolation factor CIF(j) of the first cell is determined in relation to a specific neighbouring cell j as:

$= C(1)/C(j)$ where $C(1)$ is a representation of the obtained measured values of signals transmitted in the first cell, and $C(j)$ is a representation of the obtained measured values of signals transmitted in the specific neighbouring cell j, and
   using said cell isolation factor to support radio resource management for wireless terminals in the cellular network.

13. The base station according to claim 12, wherein the control module is further adapted to use said cell isolation factor by providing it as a basis for determining whether to employ a radio resource management scheme or not, said radio resource management scheme including one or more of:
- exchanging with one or more base stations serving the at least one neighbouring cell, a High Interference Indicator, HII, referring to uplink resource allocations for cell edge terminals in the first cell,
- exchanging with one or more base stations serving the at least one neighbouring cell, an Overload Indicator, OI, referring to uplink interference experienced in the first cell,
- exchanging with one or more base stations serving the at least one neighbouring cell, a Relatively Narrow band Transmission Power Indicator, RNTPI, referring to restrictions in downlink power,
- applying Fractional Frequency Reuse, FFR, for cell edge terminals in the first cell in coordination with a predetermined set of neighbouring cells,
- applying Start Index or Random Start Index in coordination with a predetermined set of neighbouring cells,
- applying Interference Rejection Combining, IRC, in the base station's receiver for suppressing interference, and
- applying antenna tilt at the base station to reduce uplink interference.

14. The base station according to claim 13, further comprising a radio resource management unit adapted to employ said radio resource management scheme if the determined cell isolation factor is below a predefined threshold.

15. The base station according to claim 14, the control module is further adapted to use said cell isolation factor by providing it to a base station in each of the at least one neighbouring cell or to an Operations And Maintenance node configured to distribute cell isolation factors to base stations in the cellular network.

16. A base station serving a first cell in a cellular network and being configured to support radio resource management in the cellular network, the base station comprising:
- an obtaining module adapted to obtain measured values of signals transmitted in the first cell and measured values of signals transmitted in at least one neighbouring cell,
- a logic module adapted to determine a cell isolation factor, CIF, of the first cell based on the obtained measured values, the cell isolation factor indicating insusceptibility to interference from signals transmitted in said at least one neighbouring cell, and the logic module is further adapted to determine the cell isolation factor, as:

$$CIF = C(1)/\Sigma C(n)$$

where $C(1)$ is a representation of the obtained measured values of signals transmitted in the first cell, $C(n)$ is a representation of the obtained measured values of signals transmitted in each of the at least one neighbouring cell, and N is the number of neighbouring cells considered, and
- a control module adapted to use said cell isolation factor to support radio resource management for wireless terminals in the cellular network.

17. A base station serving a first cell in a cellular network and being configured to support radio resource management in the cellular network, the base station comprising:
- an obtaining module adapted to obtain measured values of signals transmitted in the first cell and measured values of signals transmitted in at least one neighbouring cell,
- a logic module adapted to determine a cell isolation factor, CIF, of the first cell based on the obtained measured values, the cell isolation factor indicating insusceptibility to interference from signals transmitted in said at least one neighbouring cell, and the logic module is further adapted to determine the cell isolation factor of the first cell in relation to a specific neighbouring cell j as:

$$CIF(j) = C(1)/C(j)$$

where $C(1)$ is a representation of the obtained measured values of signals transmitted in the first cell, and $C(j)$ is a the obtained representation of measured values of signals transmitted in the specific neighbouring cell j, and
- a control module adapted to use said cell isolation factor to support radio resource management for wireless terminals in the cellular network.

18. The method according to claim 12, wherein the determined cell isolation factor is used as a basis for determining whether to employ a radio resource management scheme or not, said radio resource management scheme including one or more of:
- exchanging with one or more base stations serving the at least one neighbouring cell, a High Interference Indicator, HII, referring to uplink resource allocations for cell edge terminals in the first cell,
- exchanging with one or more base stations serving the at least one neighbouring cell, an Overload Indicator, OI, referring to uplink interference experienced in the first cell,
- exchanging with one or more base stations serving the at least one neighbouring cell, a Relatively Narrow band Transmission Power Indicator, RNTPI, referring to restrictions in downlink power,
- applying Fractional Frequency Reuse, FFR, for cell edge terminals in the first cell in coordination with a predetermined set of neighbouring cells,
- applying Start Index or Random Start Index in coordination with a predetermined set of neighbouring cells,
- applying Interference Rejection Combining, IRC, in the base station's receiver for suppressing interference, and
- applying antenna tilt at the base station to reduce uplink interference.

19. The method according to claim 12, wherein the cell isolation factor pertains to downlink signals, and the obtained measured values include values of measurements made by terminals in the first cell of downlink signals transmitted in the first cell and of downlink signals transmitted in the at least one neighbouring cell.

20. The method according to claim 12, wherein the cell isolation factor pertains to uplink signals, the signals transmitted in the first cell and in the at least one neighbouring cell include said uplink signals, and the obtained measured values have been measured by the base station of the first cell.

21. The method according to claim 12, wherein the cell isolation factor pertains to uplink signals, the obtained measured values include values of measurements made by terminals in the at least one neighbouring cell of downlink signals transmitted in the first cell, and the obtained measured values are obtained from a base station in each of the at least one neighbouring cell.

22. The base station according to claim 17, wherein the control module is further adapted to use said cell isolation factor by providing it as a basis for determining whether to employ a radio resource management scheme or not, said radio resource management scheme including one or more of:
- exchanging with one or more base stations serving the at least one neighbouring cell, a High Interference Indicator, HII, referring to uplink resource allocations for cell edge terminals in the first cell, exchanging with one or more base stations serving the at least one neighbouring cell, an Overload Indicator, OI, referring to uplink interference experienced in the first cell, exchanging with one or more base stations serving the at least one neighbouring cell, a Relatively Narrow band Transmission Power Indicator, RNTPI, referring to restrictions in downlink power, applying Fractional Frequency Reuse, FFR, for cell edge terminals in the first cell in coordination with a predetermined set of neighbouring cells, applying Start Index or Random Start Index in coordination with a predetermined set of neighbouring cells, applying Interference Rejection Combining, IRC, in the base station's receiver for suppressing interference, and applying antenna tilt at the base station to reduce uplink interference.

* * * * *